United States Patent [19]
Shimizu et al.

[11] Patent Number: 5,396,380
[45] Date of Patent: * Mar. 7, 1995

[54] RESOLUTION ENHANCEMENT OF ABSOLUTE TRACK POSITION USING ITERATIVE PROCESS AND POSITION BURSTS WITH TRACK FOLLOWING CAPABILITY

[75] Inventors: Ryosuke Shimizu, Yawata; Tetsurou Takaoka, Uwajima; Tsukasa Yoshiura, Katano; Noriaki Wakabayashi, Hirakata, all of Japan

[73] Assignee: Matsushita Electric Industrial Co., Ltd., Kadoma, Japan

[ * ] Notice: The portion of the term of this patent subsequent to Aug. 2, 2012 has been disclaimed.

[21] Appl. No.: 730,237

[22] Filed: Jul. 15, 1991

Related U.S. Application Data

[63] Continuation-in-part of Ser. No. 657,779, Feb. 21, 1991.

[30] Foreign Application Priority Data

Jul. 16, 1990 [JP] Japan .................. 2-189089

[51] Int. Cl.$^6$ ............................................. G11B 5/596
[52] U.S. Cl. .............................. 360/78.14; 360/77.08
[58] Field of Search ............... 360/78.14, 77.08, 78.04, 360/78.06

[56] References Cited

U.S. PATENT DOCUMENTS

| | | | |
|---|---|---|---|
| 3,994,016 | 11/1976 | Moghadam | 360/77.02 |
| 4,032,984 | 6/1977 | Kaser et al. | 360/77.08 |
| 4,438,467 | 3/1984 | Schaller et al. | 360/77.11 |
| 4,524,398 | 6/1985 | Fujiki | 360/78.06 |
| 4,530,019 | 4/1985 | Penniman | 360/77.08 |
| 4,539,607 | 9/1985 | Fujiki | 360/77.08 |
| 4,631,606 | 12/1986 | Sugaya | 360/77.08 |
| 4,766,508 | 8/1988 | Mathewson | 360/77.07 |
| 5,021,898 | 6/1991 | Sakai et al. | 360/78.04 |
| 5,170,299 | 12/1992 | Moon | 360/77.08 |

FOREIGN PATENT DOCUMENTS

0065628 12/1982 European Pat. Off. .
58-10787 2/1983 Japan .

*Primary Examiner*—Aristotelis Psitos
*Assistant Examiner*—James T. Wilson
*Attorney, Agent, or Firm*—Cushman, Darby & Cushman

[57] ABSTRACT

Track codes are recorded in advance so as to be repeated every 12 tracks, and burst signals $\alpha$ and $\beta$ are also recorded in advance so as to be repeated every 2 tracks, in the servo sectors of the disk-shaped information recording medium; the track codes and the burst signals $\alpha$ and $\beta$ are reproduced with a data head, and a distance between the current position of the data head and a target track is detected from the reproduced signal of the track codes with a resolution of $\frac{1}{2}^2$ of track width, then the data head is moved to the target track so as to decrease the distance; when the data head reaches the range of the width of $\pm 6$ tracks of the target track, an expanded data head position signal having the resolution of $\frac{1}{2}^2$ is generated; and thereby the data head is controlled.

3 Claims, 10 Drawing Sheets

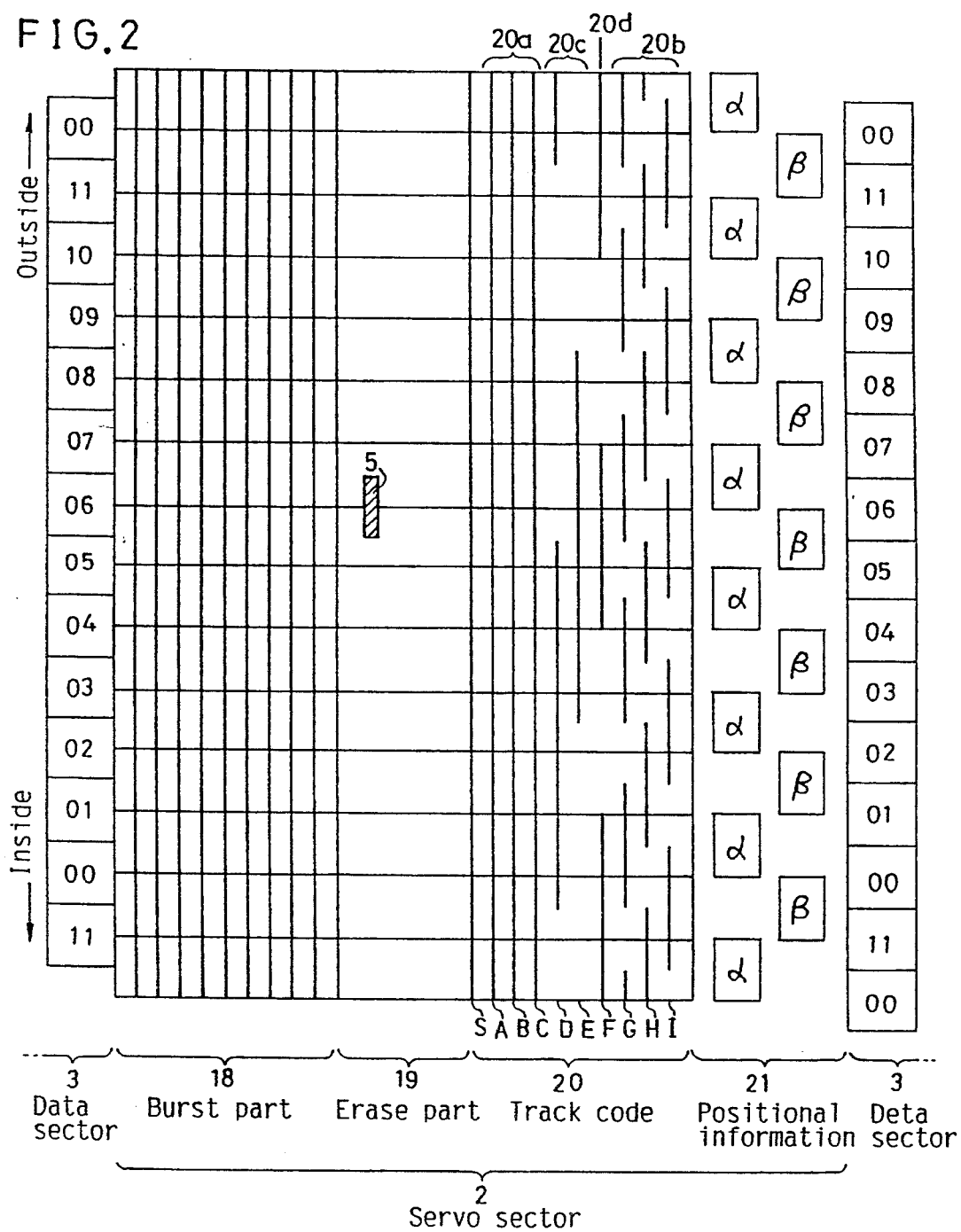
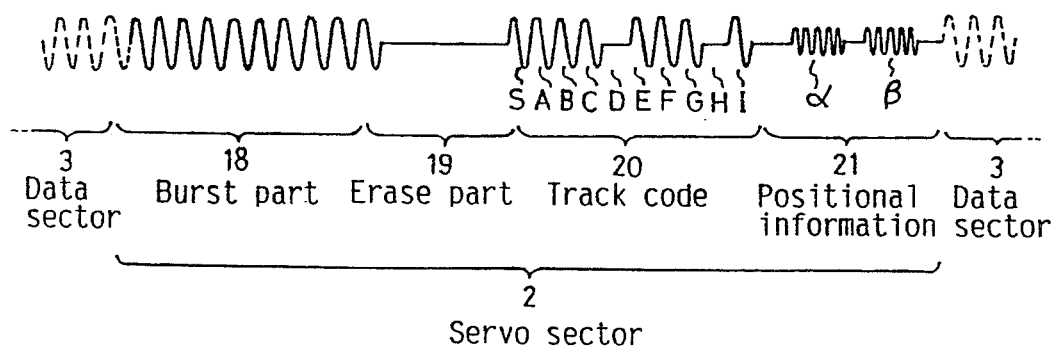

RESOLUTION ENHANCEMENT OF ABSOLUTE TRACK POSITION USING ITERATIVE PROCESS AND POSITION BURSTS WITH TRACK FOLLOWING CAPABILITY

This is a continuation-in-part of application Ser. No. 07/657,779, filed Feb. 21, 1991, and entitled APPARATUS AND METHOD FOR RECOGNIZING HEAD POSITION INFORMATION, AND APPARATUS AND METHOD FOR HEAD POSITIONING.

FIELD OF THE INVENTION AND RELATED ART STATEMENT

1. Field of the Invention

The present invention relates to a method and an apparatus for generating a data head positioning signal, and an apparatus for data head positioning that are necessary when a data head is moved to an arbitrary track containing information on a rotatable recording medium.

2. Description of the Related Art

Heretofore, in a magnetic disk apparatus, servo-control scheme using servo plane or area has been employed widely wherein, a data head can achieve the positioning action toward the destination data track, by being guided by servo information written in over the whole plane of a recording medium.

In this scheme, however, the positioning of the data head is performed on the assumption that the relation between the servo plane and the data plane is definitive and reliable one. Consequently, there has been a drawback that off-tracks were apt to happen due to various circumstantial variations such as temperature change inside the apparatus housing and hence it was substantially difficult to attain a high packing track density.

Then, in recent years, much attention has been given on the data-plane servo schemes in that the servo information was written over the data plane and thereby the reliability at the time of recording-reproduction action was improved.

As one of those schemes, the sector-servo scheme has been proposed. In this scheme, at every leading part of respective sector, positioning servo-sector has been (i.e. preliminarily written in) burled in. Then, when an arbitrary data track is selected, a data head is servo-tracked to a destination track based on the servo information of the servo-sectors,. However, in this scheme, only the information necessary for tracking control is provided. Therefore, it was a drawback that, in order to let the data head moves radically at high velocity, an extra positioning detector besides a data head must be provided, or data head position information must be supplied from the servo plane. Also, when it is intended to obtain sufficient position information to obtain even at the time of high velocity access only by the servo information of the servo-sector, the ratio of occupation from servo-sectors in the area of a recording medium necessarily increases. This induces a problem of resultant reduction of an available memory capacity in a given recording medium.

Then, it is proposed to code and record the track numbers within the servo-sectors to perform the data head access action basing on these recorded informations (Japanese published unexamined patent application=Tokkai Sho 51-131607, which is related to U.S. Pat. No. 4,032.984). In this scheme, by obtaining discretely the position information (address information) of the track over which the data head passes during the time of its seek action, average velocity between sectors is obtained, and by comparing this with an instructed velocity, the velocity control is accomplished. Thus this scheme is simple in its mechanics and has good cost performance even in case of having small number of laminated recording media, and hence it is widely being used. However, the above-mentioned scheme in which the track numbers are recorded by coding them In the servo-sectors on the recording medium plane (The Tokkai Sho 51-131607), there was a problem that only one code is allotted to each data track. Therefore, the resolution of the track position information obtainable from each servo-sector is as large as one-track width at maximum. Therefore, the error in detection of velocity, i.e., velocity detection error $\Delta V$ can be expressed by $$\Delta V = \frac{Xtp}{Ts}$$

where Xtp is the track pitch and Ts is the time necessary for passing one servo-sector pitch. $\Delta V$ is in a range of $\pm(5-10)$ cm/s. Generally, in the transient state switching from the seek action to the tracking control action, in order to make a stable radial moving and landing, a sufficient control of the moving velocity of a data head to 1–3 cm/s is necessary. However, under the situation that the velocity detection error is existing as much as several cm/s, sufficient control of the moving velocity control is difficult. Additionally, when the data head rushes to a target track, a dynamic range (a moving distance of a data head corresponding to a variable range of a signal level applied to the data head driving device in seek operation of a target track) based on a positional signal is $\pm\frac{1}{2}$ track width at most. Therefore, in order to surely introduce the data head in the target track, a rush velocity of the data head is limited to a relatively lower value. As a result, a considerable time is required until reaching a final settling position. In case that the velocity is too fast, seek error takes place and happens to give a fatal damage. That is, accuracy of the data head position detection at the time of seek action and the dynamic range of the positional signal in trace and control have been problems to be attacked for improving the total performance of the data head positioning apparatus.

For the above-mentioned coding of the track number, as the recording density on a recording medium has been improved, the number of the information tracks also increases, and hence a large area becomes necessary. That is, the ratio of occupation of servo region with respect to the data region on a recording medium increases, hence giving rise a problem that the maintaining of a large capacity is becoming difficult.

OBJECT AND SUMMARY OF THE INVENTION

An object of the present invention is to provide a data head positioning signal generating method and an apparatus therefor for accessing the data head on a disk-shaped information recording medium with a high speed and a high precision.

The data head positioning signal generating method in accordance with the present invention includes the steps of;
 discretely forming servo-patterns in circular direction of a track of a rotatable recording medium. The servo-pattern has a first region and a second region with at least two burst patterns being finely detectable a positional deviation of the data head from the center of an information track, and the first region comprising at least two sub-servo-patterns having periodic interval of width of M tracks (M is an integer of 2 or more), peak values of reproduced signal amplitudes of the above-mentioned respective sub-servo-patterns are compared respectively thereby to form a first binary-valued information, subsequently a first offset is added onto, at least one of those peak values of the aforementioned reproduced signal amplitude in compliance with a value of the first binary-valued information, then comparing respective peak values to each other again thereby to form a second binary-valued information.

A second offset is further added onto a peak value on which the first offset was added in compliance with a value of the second binary-valued information.

Further a different offset may be added from the first offset onto a peak value on which no offset was added at the time when second binary-valued information was produced, then comparing respective peak values to each other again, thereby to form a third binary-valued information. Then, the above-mentioned steps are repeated at least N times (N is an integer), thereby to recognize the data head position in the radial direction of a recording medium up to a precision of $1/(2^N)$ of the information track width, to generate a data head positioning signal weighted corresponding to a distance from a data head to a target track by using a signal of the first area in case that the absolute value of a positional error from the data head to the target track in larger than the half of a track width in positioning control of the data head and the target track. An expanded position signal having a periodic interval of the width of M tracks and a dynamic range of the width of M tracks by using the signal of the second region in case that the absolute value of the positional error is the half of the track width or below.

The data head positioning signal generating apparatus in accordance with the present invention has;

data head positioning information recognition means comprising, at least two peak holder for holding peak values of reproduced signal amplitudes of at least two sub-servo-patterns having a periodic Interval of the width of M tracks being comprised in a first region of a servo pattern formed discretely in the circular direction of a track of a rotatable recording medium, at least one comparator for comparing the at least two peak values, a first latch for memorizing the output of the comparator, thereby to hold a first binary-valued information, an offset decoder for determining to which peak holder an offset is to be added in compliance with the contents of the first latch, an offset-adder for adding an offset to a specified peak holder in compliance with the instruction of the offset decoder, a second latch for holding a second binary-valued information by memorizing momentarily a result obtained by a comparison between a peak value held by the peak holder to which the offset was already added and a peak value held by the peak holder to which offset was not added using the comparator again, N latches for latching N binary-valued informations from 1st to N-th binary-valued information, and a data head position information discrimination element for detecting the relative position relation of a data head with respect to tracks with a precision up to $1/(2^N)$ of the information track width by using contents from the 1st latch to the N-th latch, in-track position decoder for recognizing an in-track position information of the data head from at least two burst patterns formed in a second region of the servo pattern, and a central processing means ($\mu$CPU) for generating a data head positioning signal having a dynamic range of the width of M tracks in periodic interval of the width of the M tracks, by using outputs of the data head position information recognition means and the in-track position decoder.

By the data head positioning signal generating method and apparatus in accordance with the present invention, the servo patterns are discretely formed on the tracks of the recording medium. The above-mentioned servo pattern comprises a first area and a second area. The first area has at least two sub-servo-patterns of a periodic interval of the width of the M tracks. A relative position of the data head and a track is detected with a resolution of $1/(2^N)$ of track width by using the two servo patterns. Moreover, at least two burst patterns are disposed in the second area, and thereby a positional error of the data head from a center of an information track is precisely detected. Then, a data head positioning signal having a dynamic range of the periodic interval of the width of M tracks can be generated by using data head position information obtained from the above-mentioned two areas. Consequently, even if the data head rushes to a target track with a high speed, the data head is stably positioned to the target track, and high speed and high reliability seek operation is realizable.

BRIEF DESCRIPTION OF THE DRAWINGS

FIG. 2 is a pattern diagram of an actual example of discrete servo-sectors burled beforehand in the information track on a rotatable recording medium in one embodiment of the present invention shown in FIG. 1;

FIG. 3 is a reproduced waveform chart at the time when a data head radially moves the servo-sectors as has been shown in FIG. 2;

It will be recognized that some or all of the Figures are schematic representations for purposes of illustration and do not necessarily depict the actual relative sizes or locations of the elements shown.

DESCRIPTION OF THE PREFERRED EMBODIMENTS

In the following, explanation is given with reference to the accompanying drawings on a data head positioning signal generating method and apparatus thereof as well as a data head positioning apparatus as preferred embodiments of the present invention.

Figure 1:
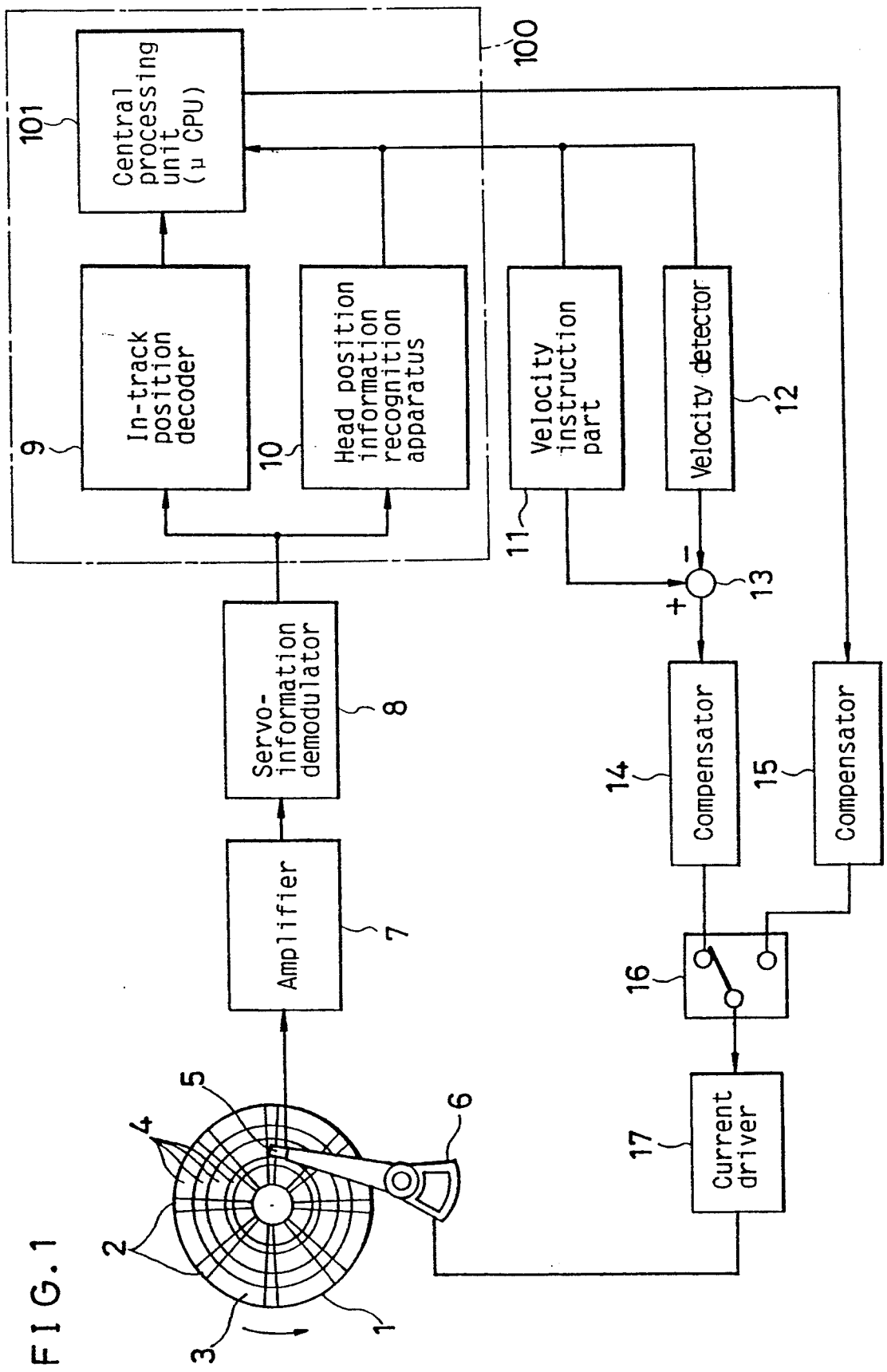
FIG. 1 is a block diagram of a fundamental embodiment of a data head positioning apparatus in one embodiment of the present invention.

FIG. 1 is a block diagram of a fundamental embodiment of a data head positioning apparatus as the preferred embodiment of the present invention. As shown in figure, a rotatable recording medium 1 such as a magnetic hard or flexible disk which is to be revolved by a known spindle motor (not shown in the figure) has a number of discrete servo-sectors 2,2 ... for recording the servo informations. The information or data of the servo-sectors 2 are buried beforehand (or preliminarily recorded) discretely with a predetermined pitch in a manner to be read by a data head 5 which runs in the circular direction on the information track on the recording medium plane. Data sectors 3,3 ... are disposed between said servo-sectors 2,2 ... for recording data to be recorded thereon information tracks 4,4 ... are provided in the data sectors on the recording medium plane. The information of the data sectors 3,3 can be written in and read out from the information tracks through the data head. A VCM (voice coil motor) positioner 6 is provided in a manner to make necessary moving (accessing) of the data head 5 to a selected information track by moving the data head 5 radically of the recording disk 1. An amplifier 7 amplifies signals reproduced by the data head 5. A servo information demodulator 8 receives reproduced signals from the amplifier 7 and detects servo-sectors 2, 2 ... which are placed discretely on a recording medium 1, thereby to extract only the servo information and outputs it. An in-track position decoder 9 decodes and detects the positions of the data head 5 inside the information tracks 4,4, ... over which the data head passes by, with a dynamic range of $\pm\frac{1}{2}$ track width by using at least two burst patterns formed In a second area of the servo sector as will be described later. A data head position information recognition apparatus 10 recognizes and discriminates the relative position of the data head 5 with respect to the information tracks 4,4, ... with a precision of $1/(2^N)$ of the track width by using at least two servo patterns formed in a first area of the servo sector as will be described later.

A data head positioning signal generating apparatus 100 calculates a distance in a radial direction of the recording medium between a track decided arbitrarily and the data head with the resolution of $1/(2^N)$ of the track width by using the output of the data head positional information recognition means 10 and a central processing unit ($\mu$CPU) 101. A data head positioning signal having a dynamic range of the width of M tracks and a periodic interval of the width of M tracks is generated from the data head positioning signal generating apparatus 100. A velocity instruction part 11 instructs a target velocity, corresponding to the distance to a selected destination track or the number of tracks to cross over to reach the destination track, at the time of the track access control for accessing or transferring the data head to the selected information track. Ordinarily, the velocity instruction part 11 is realized with a ROM table or the like. But the velocity instruction part 11 may be such one that, an arithmetic processing on the measured data is made by using a function which is prescribed in the instruction part 11, thereby to issue output, every time the distance to the destination track or the number of tracks to cross over to reach the destination track is measured. A velocity detector 12 performs arithmetic processing every time when the data head 5 passes a servo-sector 2 by receiving as its input data head position information of high resolution from the data head position recognition apparatus 10, thereby to output radial moving velocity of the data head in the radial direction of the recording medium. For the velocity detector 12, at the time of performing the velocity detection, not only output from the above-mentioned data head position information recognition apparatus 10, but also current flowing in the VCM positioner 6 may be used in addition to the above-mentioned output. An error amplifier 13 is for performing an error calculation between the outputs of the above-mentioned velocity instruction part 11 and the velocity detector 12. The output of this error amplifier 13 is supplied through a compensator 14 and a switch 16 to a current driver 17, which supplies the current to the VCM positioner 6 responding to the output of the compensator 14, and thus a track access control loop is constituted. The tracking control loop which makes the data head 5 track a selected information track is constituted by supplying the output off the data head positioning signal generating apparatus 100 to the current driver 17 through the compensator 15 and the switch 16.

FIG. 2 is an actual example (of servo-pattern) of the circularly discrete servo-sectors 2 burled beforehand in the information tracks 4 on a rotatable recording medium in one embodiment of the present invention shown in FIG. 1. In the figure, numeral 3 represents a data sector. This servo-sector 2 comprises: a burst part 18, an erase part 19 for detecting the servo-sector, a track code part 20 for acquiring the track address information, and a positional information 21 for acquiring the position deviation information from the on-track of the data head during the tracking control time. The erase part 19 is taken so as to give a maximum erasing time on the information tracks of the recording medium 1. The positional information 21 comprises burst signals $a$ and burst signals β, and they are set with a lateral shift as large as a half track width with respect to respective tracks of the data sectors 3. Writing in on the servo-sector is prohibited.

The above-mentioned track code part 20 comprises by burying therein a synchronization bit (hereinafter: sync bit) S, a zone discrimination part 20a, a second servo pattern 20c, a third servo pattern 20d and a first servo pattern 20b. The sync bit part S is for indicating the end of the DC erase part and the beginning of the track code part 20. The zone discrimination part 20a comprises three dibit patterns A, B, and C and is for discriminating between the guard zone and the data zone and the sorts of data zones. The first servo-pattern 20b comprises a three-phase dibit patterns G, H, and I each having a period of as much as three tracks. The second servo-pattern 20c comprises two dibit patterns D and E each having a period of as much as 12 tracks and a shift of 3 tracks therebetween. The third servo pattern 20d comprises a dibit pattern F having a period of as much as 6 tracks and a shift of at least of 1.5 tracks from the second servo pattern 20c.

Apart from the case of FIG. 2, wherein the second servo-pattern 20c having two dibit patterns and the third servo-pattern 20d are placed on one side of the first servo-pattern 20b, another mode may be embodied such that the second servo-pattern comprising two dibit patterns are separated and placed respectively on both sides of the first servo-pattern. It is further possible to place the second servo-pattern on one side of the first servo-pattern and place the third servo-pattern on another side of the first servo-pattern. Furthermore, it is also possible to place each of the second servo-pattern and the third servo-pattern alternately with respect to the first servo-pattern comprising three dibit patterns. At the time of record and reproduction to and from the data track through the data head 5, the data head 5 runs across successive two tracks of the servo-sector 2.

Now, assuming that the data head 5 is at the sixth track of a recording medium 1, waveform reproduced from the data head S becomes as shown in FIG. 3. That is, in the burst part 18 a specified reference signal is reproduced. In the erase part 19, no signal is reproduced. And in the track code part 20, the following signals are reproduced corresponding to respective servo patterns respectively: at the sync bit position S, at the zone discrimination positions A, B, and C, at the second servo-pattern positions D and E, at the third servo-pattern position F, and at the first servo-pattern positions G, It, and I. And further in the position information 21, the signals are reproduced respectively at the burst signal α and the burst signal β. At this time, since the data head 5 runs above adjacent two tracks half and half in the servo-sector 2, in case that pattern is present only on one track, its output becomes about ½ in comparison with the case that patterns are present on both tracks. In FIG. 3, reproduced signal becomes as follows: at the positions S, A, B, C, E, F, G, and I, output becomes 1; at the positions D and H, output becomes 0; and at the burst-positions α and β, output becomes ½. The above-mentioned reproduced signal changes depending upon the track position on a recording medium on which the data head 5 is present.

In the present invention, according to the first to the third servo-patterns 20b, 20c, 20d which were obtained as has been described above, the track position of the data head 5 with respect to the recording medium is detected with a high precision. Then, toward the destination track thus selected, the seek action is performed to achieve the data head positioning action.

Figure 4:
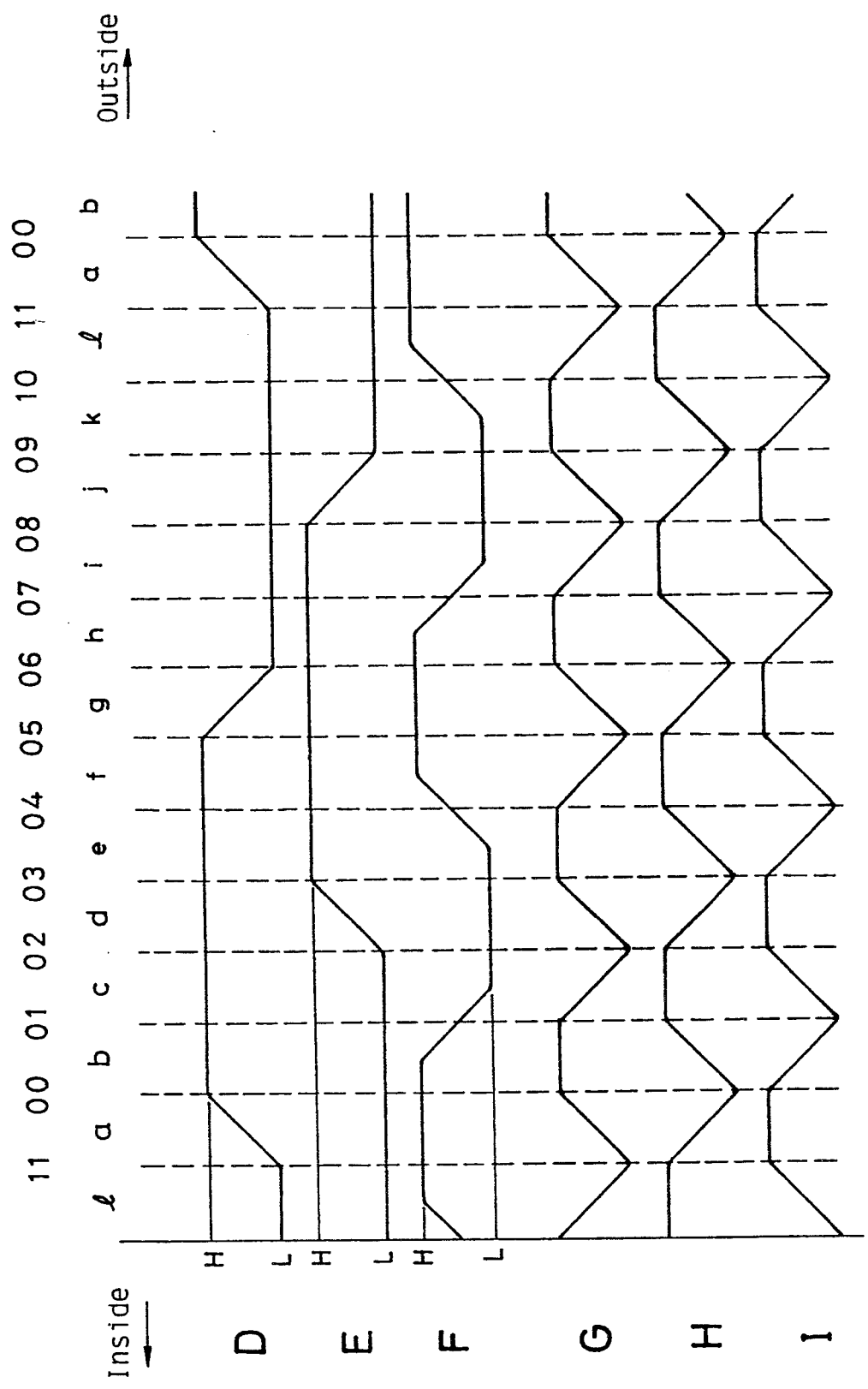
FIG. 4 is a reproduced output state timing chart showing an ideal reproducing state at the time when the data head is let to moves radially in a slow velocity over servo-sectors as shown in FIG. 2 from an inside track to an outside track of a recording medium.

FIG. 4 shows an ideal output state timing chart of a reproduced waveform at the time when the data head 5 is driven to move with a slow velocity over servo-sectors from an inside track to an outside track of a recording medium as shown in FIG. 2. Because the data head 5 has a finite width, the slope part of respective reproduced signal in FIG. 4 is, determined by the output value responding to the occupation ratio of dibit pattern width to the data head width at the point of time when the data head passes respective dibit patterns. In FIG. 4, those numbers from 00 to 11 correspond to the track numbers of 12 track periods shown in the left end blocks in FIG. 2. Cyclic Alphabetical notations from a to 1 represent servo-track numbers of 12 track periods which are radially shifted as large as a half track width.

Hereupon, reproduced signals D, E, and F obtained from the second and the third servo-patterns are processed to binary-valued signals determined by a prescribed threshold level. The reproduced signals G, H, and I obtained from the first servo-pattern are peak-held and thereafter respective values are compared and converted into binary-valued information. The above-mentioned two different groups of binary-valued informations, which are obtained from a first group information D, E and F and from a second group information G, H and I of the reproduced signals of D, E, F and G, H, I, are let to be a first binary-valued information. According to values of the above-mentioned first binary-valued information, a predetermined offset is added to a signal in which the lowest value among the above-mentioned signals G, H, and I is held. Then, by performing again a next comparison of this offset value with the corresponding signal, a second binary coded information is obtained. According to the above-mentioned first binary-valued information and second binary-valued information, the position of the data head 5 on the servo-track is recognized accurately up to a precision of $1/(2^2)$ of the track width.

The second servo-patterns D and E have a period of 12 tracks, a mutual delay of 6 tracks, hence have a mutual overlap of 3 tracks, and produce from their reproduced signal the signal E and the signal D. Accordingly, as far as the reproduced signals are ideal, it is possible to discriminate 3 tracks out of those 12 tracks. However, since the data head has a finite width, the reproduced output does not change digitally and since the reproduced waveforms are influenced by the response characteristics of the recording medium or of the data head, it is difficult to discriminate digitally 3 tracks out of 12 tracks.

Then a third servo-pattern having a period of 6 tracks and an overlap as much as 1.5 track width with the D pattern or the E pattern is provided. As a result, the third patterns F becomes definitely always "L" level of "H" level at the slope parts of the D signal or the E signal. In the servo-sector having a period of 12 tracks, binary-valued information of D signal, E signal and F signal for each track are shown in TABLE 1. Mark * indicates those regions in which the binary-valued output is not determined to the definite "L" or "H" level depending on the position of the data head at the time of signal detection.

TABLE 1

| Sector | [Two valued information by signals D, E and F] | | |
|---|---|---|---|
| | Signal D | Signal E | Signal F |
| a | * | L | H |
| b | H | L | * |
| c | H | L | * |
| d | H | * | L |
| e | H | H | * |
| f | H | H | * |
| g | * | H | H |
| h | L | H | * |
| i | L | H | * |
| j | L | * | L |
| k | L | L | * |
| l | L | L | * |

As is understood from this TABLE 1, it is constituted such that when the level of either one of the signal D or the signal E is not determined, the level of the signal F is determined to "L" or "H". Accordingly, when the level of either two signals among signals D, E and F are detected, it can be discriminated that the data head 5 is present in which 3 tracks among 12 tracks.

Figure 5:
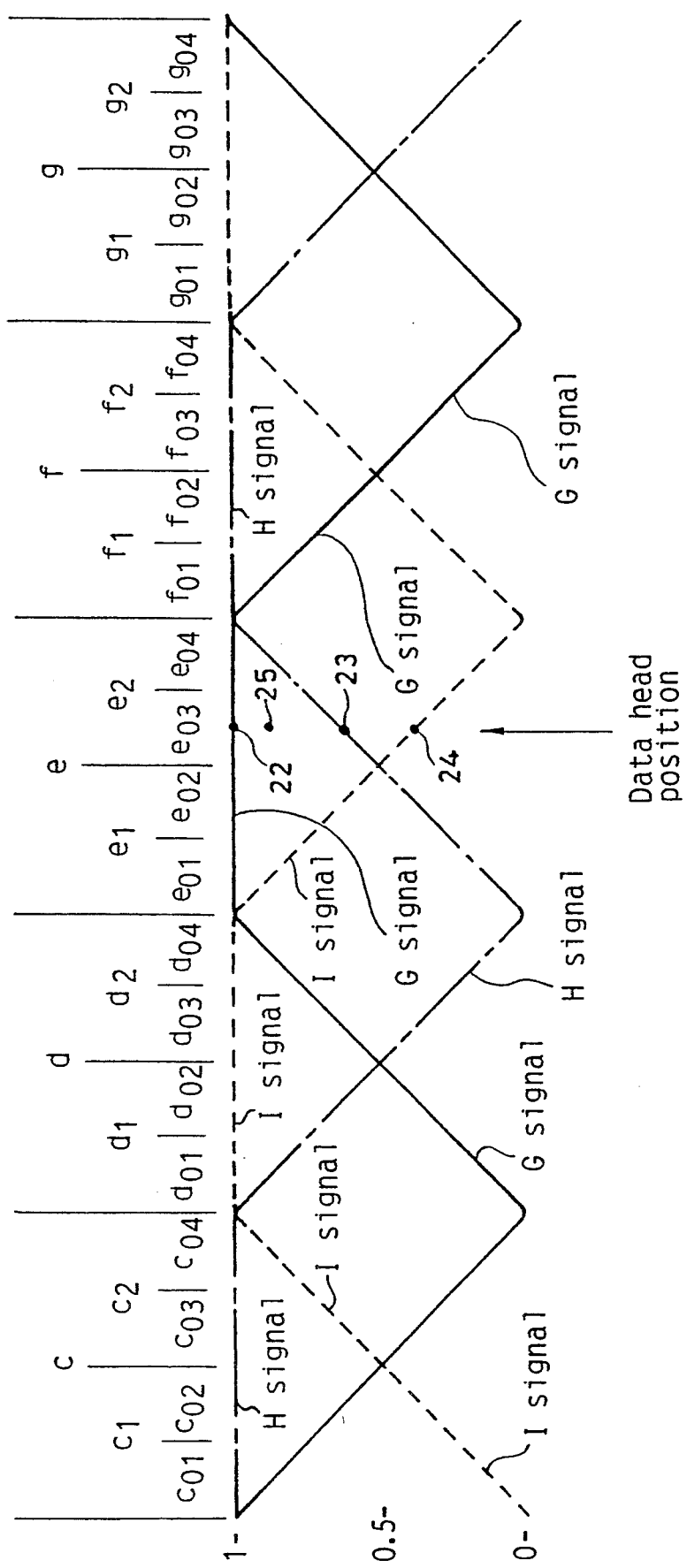
FIG. 5 is a reproduced output state timing chart showing an ideal state of the reproduced output of signal G, signal H, signal I at the time when the data head is let to move in a slow velocity over servo-sectors as shown in FIG. 2 from inside tracks to the outside tracks of a recording medium.

Next, from the reproduced signals G, H, and I obtained from the first servo-pattern, at which position of the above-mentioned discriminated 3 track the data head 5 is present is discriminated. FIG. 5 shows, likewise in FIG. 4, an ideal output state timing chart of signals G, H, and I at the time when the data head is let to move with a slow velocity over servo-sectors from an inside track to an outside track of a recording medium as shown in FIG. 2. In FIG. 5, in which the data head 5 moves from the servo-track c to g, the variation is expanded and shown. Here, the signals G, H, and I are shown with overlapping them to each other. The peak value of the output of the signals G, H, and I are represented after normalizing them (the maximum value is taken to be 1). Now, assuming the detected codes of the signals D, E, and F to be "H" "H" "L", as is understood from TABLE 1, the data head is to be present at some place on the tracks of d, e, or f in the servo-sector. Assuming that the peak value of the reproduced signal from the signals G, H, and I are respectively 22, 23, and 24 as shown in FIG. 5, it is understood-that value of G signal is larger than value of It signal, value of H signal is larger than value of I signal, and value of I signal is smaller than value of G signal. That is, when an examination of relations such as value of G signal > value of H signal,
value of H signal > value of I signal, and
value of I signal > value of G signal are performed, an answer as "H, H, and L", which means "TRUE, TRUE and NOT TRUE", is obtained. From this answer, respective peak values of G, H, and I are judged to be in an order of G, H, and I in their height order. As a result of this, as is understood also from FIG. 5, the data head position is discriminated to be such that, from the fact that the G signal is largest, it is present in the e track among three tracks of d, e, and f, and from the fact that value of H signal > value of I signal, it is present in a region $e_2$ (shown in FIG. 5). Next, based on the first binary-valued information (D signal, E signal, F signal, G signal, H signal, and I signal are respectively "H", "L", "H", "H", and "L"), an offset is added onto the I signal which has the lowest peak value. A value of offset at the first offset-adding process is selected to be equivalent to 0.5. After adding the offset of 0.5, the peak value of I signal moves to a position in FIG. 5 from 24 to 25. Thereafter, again in case of performing the examination of value of H signal > value of I signal, its answer becomes "L" which means NOT TRUE. Among answers given by this comparison, the comparison of value of H signal > value of I signal (but, after adding the offset of 0.5) is useful for discriminating a more detailed position. That is, if the answer in the case of performing the comparison of value of H signal > value of I signal (after adding the offset of 0.5) becomes "H", it becomes that the peak value of the H signal is larger than the peak value of the I signal by more than 0.5. On the other hand, if the answer becomes "L" it becomes that the difference between the peak value of the H signal and the peak value of the I signal is to be less than 0.5. That is, the data head position can be discriminated to be whether in a leading half part $e_{03}$ or in a latter half part $e_{04}$ of the above-mentioned $e_2$ region. As a result of this, it becomes that the difference between the peak value of the H signal and the peak value of the I signal is to be less than 0.5. Therefore, as is understood also from FIG. 5, the data head position is discriminated as to be present at the region $e_{03}$ which is in the $e_2$ region shown in FIG. 5. As has been described above, according to the second binary-valued information, it becomes possible to discriminate accurately the relative position relation of the data head with respect to the track in the servo-track with a precision up to $1/(2^2)$ of the track width.

Furthermore, an offset of −0.25 to the I signal and thereafter performing the comparison of value of H signal > value of I signal (after adding the offset of 0.5–0.2), a third binary-valued information is produced. Thereby, it becomes possible to discriminate accurately the relative position relation of the data head with respect to the track in the servo-track with a precision up to 1/(23) of the track width.

As has been described above, according to the (N−1)-th (N≧2) binary-valued information, an offset expressed by $$\pm \frac{1}{2^N}$$

is added onto the G signal, H signal, or I signal. Hereupon, the double sign is determined by the (N−1)-th binary-valued information such that: when the binary-valued information is "H", the − sign must be taken, whereas when it is "L". The + sign must be taken. By adding such offset, it becomes possible to discriminate the relative position relation of the data head with respect to the track in the servo-track with a precision up to $1/(2^N)$ of the track width.

Table 2 tabulates the first binary-valued information described above, that is, those information in accordance with G signal, H signal, and I signal of 3 track periods in the servo-sector, and also those cases of value of G signal > value of H signal, value of H signal > value of I signal, and value of I signal > value of G signal.

TABLE 2

| | [The first binary-valued information using signals G, H, and I] | | | |
|---|---|---|---|---|
| Servo-track | | G > H | H > I | I > G |
| a, d | $a_1 d_1 g_1 j_1$ | L | L | H |
| g, j | $a_2 d_2 g_2 j_2$ | H | L | H |
| b, e | $b_1 e_1 h_1 k_1$ | H | L | L |
| h, k | $b_2 e_2 h_2 k_2$ | H | H | L |
| c, f | $c_1 f_1 i_1 l_1$ | L | H | L |

TABLE 2-continued

[The first binary-valued information using signals G, H, and I]

| Servo-track | | G > H | H > I | I > G |
|---|---|---|---|---|
| i, 1 | $c_2\ f_2\ i_2\ l_2$ | L | H | H |

Hereupon, alphabetical notations, (a-1), ($a_1$, $a_2$-11, 12) are the same ones as shown in FIG. 5. Since it never takes place that the binary-valued informations becomes "H, H, and H or L, L, and L", they are not included in the table. Now, reference of this table is explained taking an example. Assuming that the data head 5 is present at the position shown in FIG. 5, answers for the examination conditions G>H, H>I, and I>G become "H, H, and L". From TABLE 1, the data head 5 is present in either one of d, e, or f within the servo-sector. From TABLE 2, the data head position is determined to be in the region $e_2$.

Next, in order to determine with a precision up to $\frac{1}{4}$ of the track width, the second binary-valued information is produced. For making this, to which signal the first offset is to be added is shown in TABLE 3.

TABLE 3

[Signal to which the first offset is to be added]

| Signal to which the first offset is to be added | First binary-valued information | | |
|---|---|---|---|
| | G > H | H > I | I > G |
| G | L | * | H |
| H | H | L | * |
| I | * | H | L |

Among the first binary-valued informations, when G>H, H>I, and I>G are "H, H, and L", signals G, H, and I are judged to be in an order of G, H, and I in their height order. Accordingly, the signal the first offset of 0.5 is to be added is judged to be the I signal. Referring to TABLE 3, it is understood that, in case that the answer for the conditions G>H, H>I, and I>G is "*, H, and L", the signal to which the first offset to be added is the I signal. This agrees with the result described above. Therefore, by referring to TABLE 3, the signal name to which the first offset to be added can be determined. Furthermore, after adding the first offset, by repeating the comparisons examination of G>H, H>I, and I>G, the second binary-valued information is obtained. By means of the second binary information, discrimination of the data head position is achieved with a precision of 1/(2) of the track width. In TABLE 4, results of the region discrimination by the second binary-valued information are shown. Hereupon, the leftest column mark indicates the signal names to which the first offset was added, and * mark means "no need of adding the offset". In the case of the example described above, from TABLE 4, it can be discriminated that the data head is present in the region $e_{03}$, because a meaningful second binary-valued information, that is, answer for the examination H>I, becomes "H".

TABLE 4

[Region discrimination by the second binary-coded information]

| | | G > H | | H > I | | I > G |
|---|---|---|---|---|---|---|
| G | H | $a_{02}\ d_{02}$ | | * | H | $c_{04}\ f_{04}$ |
| | | $g_{02}\ j_{02}$ | | | L | $c_{03}\ f_{03}$ |
| | L | $a_{01}\ d_{01}$ | | | L | $c_{03}\ f_{03}$ |
| | | $g_{01}\ j_{01}$ | | | | $i_{03}\ l_{03}$ |
| H | H | $a_{04}\ d_{04}$ | H | $b_{02}\ e_{02}$ | | * |

TABLE 4-continued

[Region discrimination by the second binary-coded information]

| | | G > H | | H > I | | I > G |
|---|---|---|---|---|---|---|
| | L | $g_{04}\ j_{04}$ | L | $h_{20}\ k_{02}$ | | |
| | | $a_{03}\ d_{03}$ | | $b_{01}\ e_{01}$ | | |
| | | $g_{03}\ j_{03}$ | | $h_{01}\ k_{01}$ | | |
| I | | * | H | $b_{04}\ e_{04}$ | H | $f_{02}\ f_{02}$ |
| | | | | $h_{04}\ k_{04}$ | | $i_{02}\ l_{02}$ |
| | | | L | $b_{03}\ e_{03}$ | L | $c_{01}\ f_{01}$ |
| | | | | $h_{03}\ k_{03}$ | | $i_{01}\ l_{01}$ |

In order to discriminate the data head position with a higher precision up to $1/(2^3)$ of the track width, depending upon whether the answer of the second binary-valued information is "H" or "L", necessary second process is divided into (i) an addition of an offset of 0.25 to the signal to which the first offset was added and (ii) a subtraction of the same amount of offset from the signal to which the first offset was added. Apart from the above procedure, it is also possible to add 0.25 to other member of paired signals which have been used for the comparison in order to produce the second binary-valued information. For example, in the above-mentioned example, there are two procedures; after subtracting as much as 0.25 from the peak value of the I signal to which 0.5 was added, the comparison of H>I is repeated, or after adding 0.25 to the H signal, the comparison of H>I is repeated. It can be discriminated that, when the answer is "H", the data head is present at the latter half part of the region $e_{03}$, while when the answer is "L", the data head is present at the leading half part of the region $e_{03}$. Thus it becomes possible to discriminate the position of the data head with a precision up to $1/(2^3)$ of the track width. In any of the above-mentioned procedures, an offset of $1/(2^N)$ of the maximum value of the reproduced signals is added to such one of those reproduced signals G, H, and I that shows the lowest peak value, and then the comparison examinations of G>H, H>I, and I>G are repeated. By this processes the discrimination of the data head position up to a precision of $1/(2^N)$ becomes possible.

Figure 6:
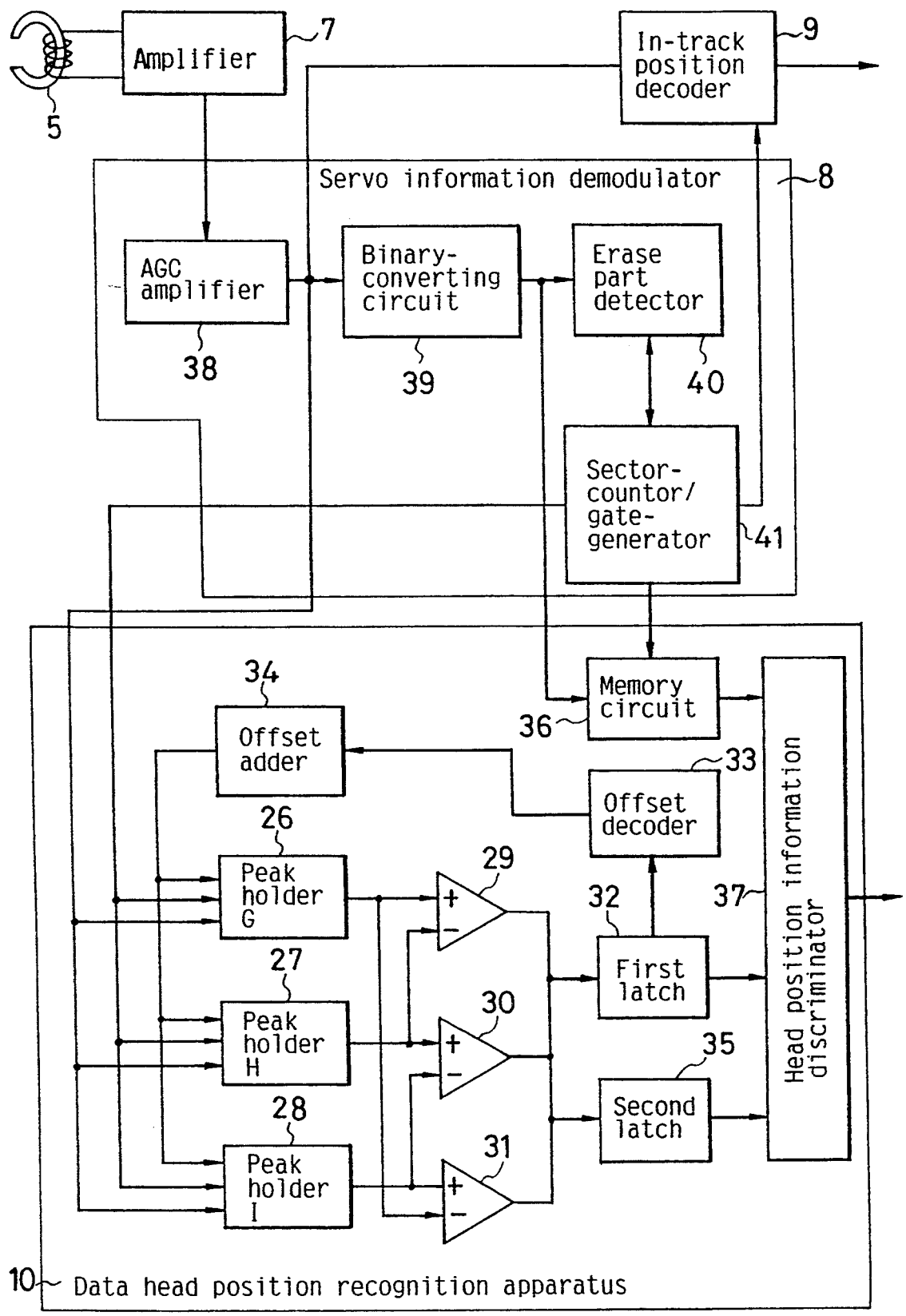
FIG. 6 is a block diagram showing further in detail a servo information demodulator (8) and a data head position information recognition apparatus (10) of a data head positioning apparatus in one embodiment of the present invention.

FIG. 6 is a block diagram which show one embodiment of further details of a data head position information recognition apparatus 10 and a servo information demodulator 8 of a data head positioning apparatus. After detecting signals by the data head 5 from the recording medium 1 the signals are is amplified by an amplifier 7, and the output thereof is supplied to an AGC amplifier 38. The AGC amplifier 38 normalizes the output value using such as a burst part 18 buried in the servo-sector 2. A servo information demodulator 18 comprises the AGC amplifier 38, a binary-converting circuit 39 and a sector-counter/gate-generator 41. The binary-converting circuit 39 converts the signal normalized by the AGC amplifier with a prescribed threshold value, an erase part detector 40, which finds out the erase part 19 having a longest space part out of successive binary-valued signals. The sector-counter/gate-generator 41 detects the erase part 19 and at the same time lets the counter part thereof start to generate gate signal for detecting signals A to I in the track code 20 and α-burst and β-burst representing in-track position information both of which are buried and formed in a servo-sector 2; the sector-counter/gate generator 41 further generates gate signal for discriminating the next-coming servo-sector from the data sector 3. The in-track position decoder 9 receives gate instructions from the sector-counter/gate-generator 41, thereby receives only the α-burst and β-burst representing in-track position information and performs an arithmetic calculation of "α-burst- β-burst" to detect the in-track position during the time of tracking control.

The data head position information recognition apparatus 10 comprises a memory circuit 36, peak holders 26, 27 and 28 for G, H and I signals, respectively, comparators 29, 30 and 31, a first and a second latch 32 and 35, respectively, an offset adder 34, a memory 36 and a data head-position-informing discriminator 37. The memory circuit 36 memorizes momentarily binary-valued information of signals A, B, C, D, E, and F out of binary-valued signals binary-converted by a binary-converting circuit 39. The peak holder G 26, the peak holder H 27, and the peak holder I 28 receive the gate instruction from the sector-counter/gate-generator 41 and hold respective peak values of the signals G, H, and I. The comparator 29 compares the peak value of the peak holder G 26 and the peak value of the peak holder It 27. The comparator 30 compares the peak value of the peak holder H 27 and the peak value of the peak holder I 28. The comparator 31 compares the peak value of the peak holder I 28 and the peak value of the peak holder G 26. The first latch 32 holds binary-valued information of the comparators 29, 30 and 31 and constitutes a first binary-valued information together with the binary-valued information of the memory 36. The offset decoder 33 determines to which peak holder among G 26, H 27, and I 28 a first offset is to be added, depending on the decoding schemes in the aforementioned TABLE 3. The offset adder 34 adds a prescribed offset value to either one of the peak holders G 26, H 27, and I 28 in compliance with the instruction of the above-mentioned offset decoder 33. The second latch 35 holds the result of comparison between the peak value of the peak holder to which an offset was added by the offset adder 34 and the peak value of the corresponding peak holder and forms a second binary-valued information. The data head position information discriminator 37 discriminates the relative position of the data head with respect to the servo-track by using the first binary-valued information consisting of the contents of the above-mentioned memory circuit 36 and the first latch 32 and by using the second binary-valued information consisting of the contents of the second latch 35.

By taking a constitution as has been described above, the data head position information recognition apparatus 10 becomes capable of discriminating the relative position relation of the data head with respect to the track in the servo-track with a precision up to $1/(2^2)$ of the track width. Accordingly, at the time of controlling the track access, it becomes possible to recognize the moving velocity of the data head as precisely as four (4) times of that of prior art, thereby achieving a high accuracy velocity control of the data head.

Hereupon, in the data head position information discriminator 37, the position discrimination of the data head using TABLE 1, TABLE 2, TABLE 3, and TABLE 4can be made by a hardware utilizing such as ROM table, or can be made by a software utilizing such as a micro-CPU and a program.

Figure 7:
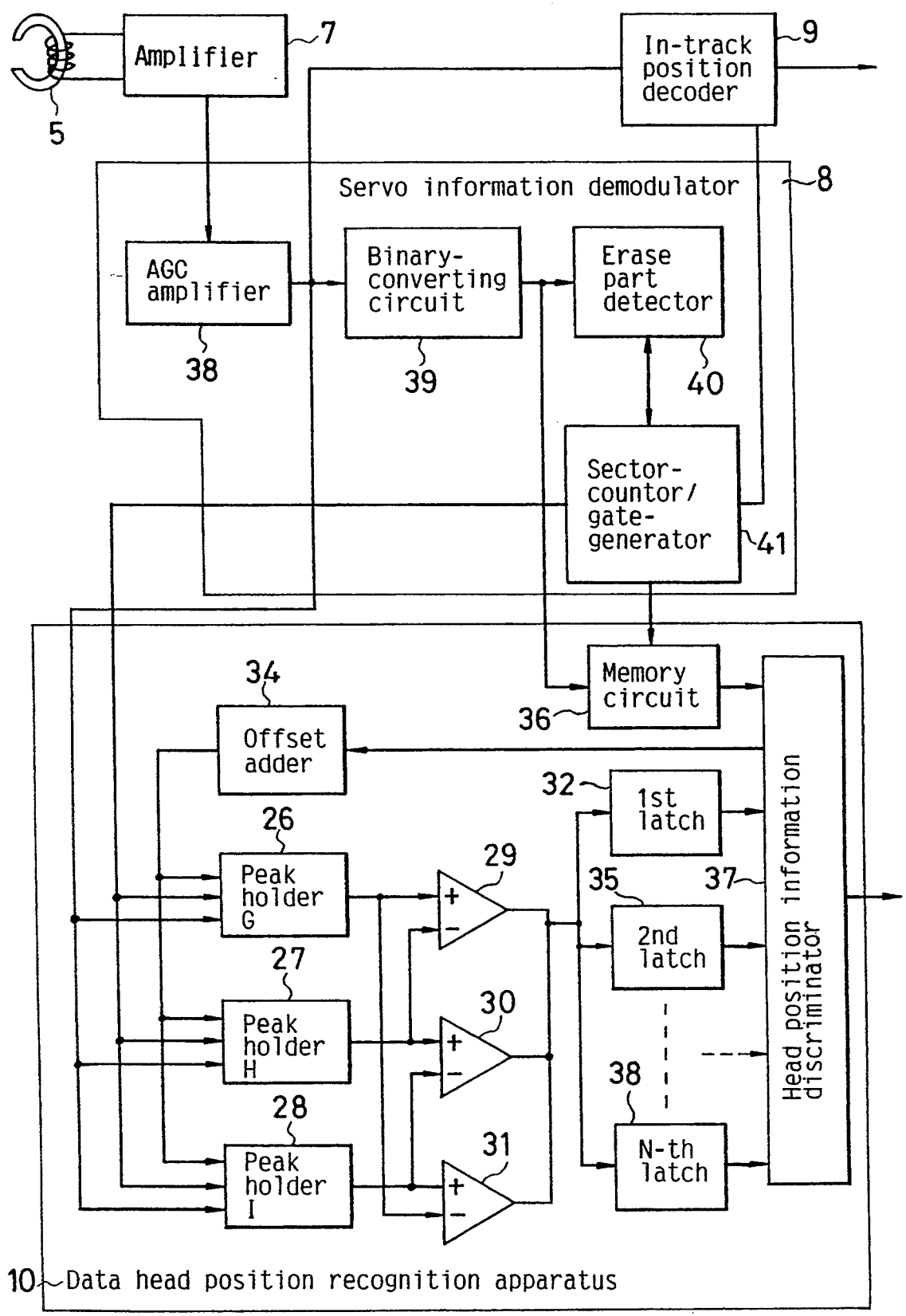
FIG. 7 is a block diagram showing In detail a servo information demodulator (8) and a data head position information recognition apparatus (10) for a case having such a modified constitution that the position relation of the data head with respect to servo tracks can be discriminated more accurately In comparison with the case of FIG. 6 up to a precision of $1/(2^N)$ of the track width.

FIG. 7 is a block diagram for a case that the constitution is devised so that the relative position of the data head position information recognition apparatus 10 with respect to servo-tracks 2,2—of the data track 4? can be discriminated accurately up to a precision of $1/(2^N)$ of-the track width. In the figure, those blocks having the same numerals as in FIG. 6 have the same function as those blocks in FIG. 6 have. In FIG. 7, the data head position information discriminator 37 performs the following processes: It selects a peak holder 26, 27 or 28 to which a first offset is to be added and instructs a first offset value to be added to the offset adder 34 based on a first binary-valued information formed by the memory circuit 36 and the first latch 32. Then it performs a comparison between a peak value held in the peak holder 26, 27 or 28 to which the offset was already added and a peak value of a paired peak holder, thereby to form a second binary-valued information on the second latch. Then according to the result of this second binary-valued information, the data head position information discrimination element 37 selects a peak holder 26, 27 or 28 to which a second offset is to be added and instructs a second offset value to be added to the offset adder 34. And it performs a comparison between a peak value held in the peak holder to which the offset was already added and a peak value of a paired peak holder and thereby forms a third binary-valued information on the third latch.

By further repeating the above-mentioned processes n-times, binary-valued informations of from 1st to N-th are formed on the 1st to N-th latches 32, 35,-38. As a result, by using the binary-valued informations of the 1st through the N-th latches, it becomes possible that the data head position information recognition apparatus 10 discriminate the relative position relation of the data head 5 with respect to the track 2 in the servo-track with a precision up to $1/(2^N)$ of the track width. Consequently, at the time of control of track trace and control of the track access, the moving velocity of the data head can be recognized as precisely as N times of that of prior art, thereby achieving a high accuracy velocity control of the data head. Hereupon, although it is possible to constitute the data head position information discriminator 37 by only a hardware utilizing such as ROM table, it is yet desirable to constitute it using a hardware such as one-chip micro-CPU and a software to operate it.

Figure 8:
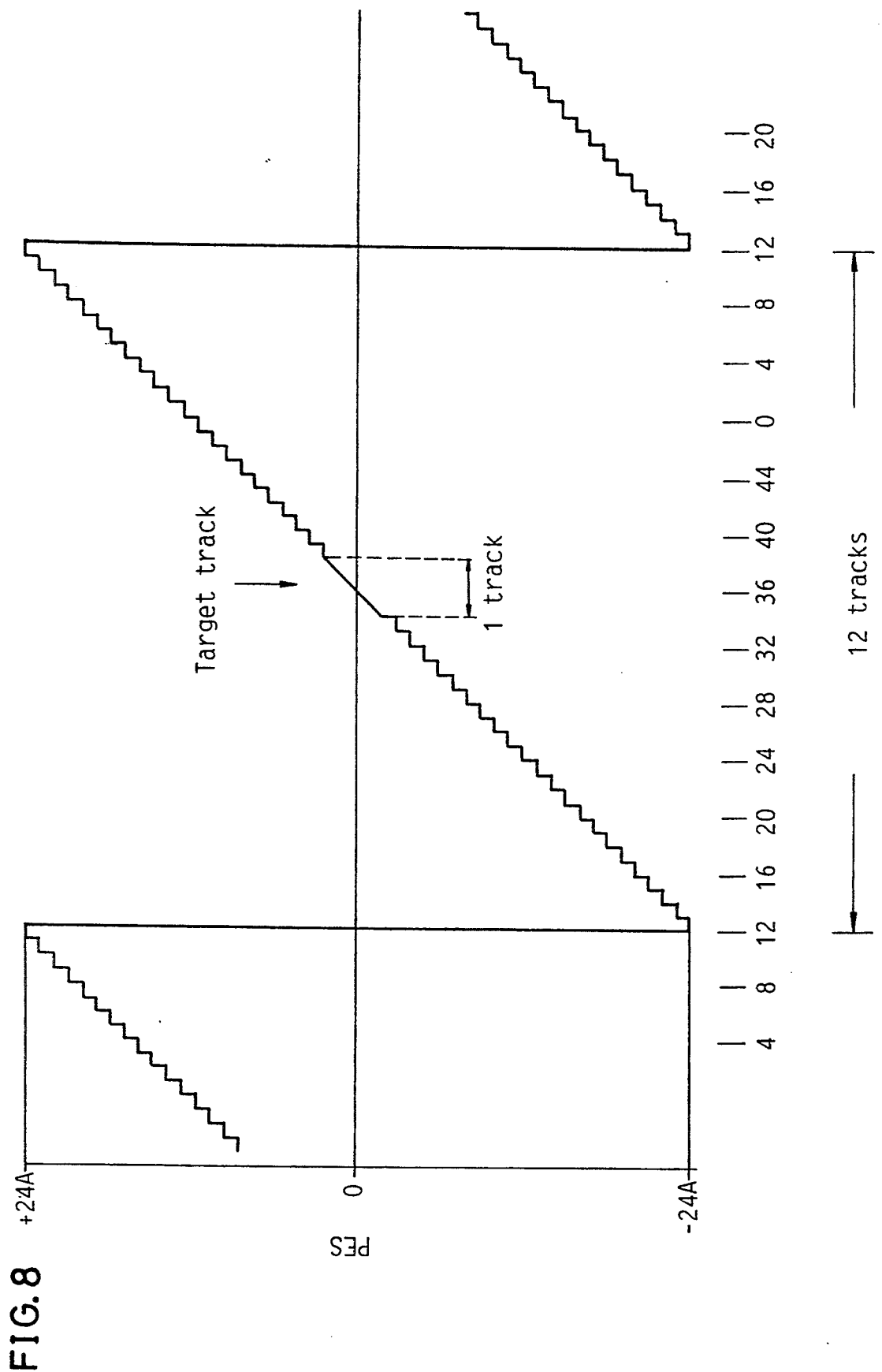
FIG. 8 is a diagram showing an expanded position signal having a periodic interval of 12 tracks.

FIG. 8 is a diagram of an "expanded positional signal" having a periodic interval of 12 track width (an interval of 12 times of on track pitch). The diagram is generated by the data head positional signal generating apparatus 100, which comprises the in-track position detector 9, the data head positional information recognition apparatus 10 and the central processing unit 101. The periodic interval of the position signal is 12 track width. A target track is positioned at the center of the position signal. In a range within about $\pm\frac{1}{2}$ of a track width adjacent to the center, a position signal having a linear characteristic is generated so as to enable fine detection of the data head position. Other parts of the position signal in the range of 12 track width are step-wave signals having a resolution of $1/(2^2)$ of the information track width. Therefore, the position of the data head 5 is detected with the resolution of $1/(2^2)$ of the information track width, and an expanded position signal is represented by range codes of 0–47. The numerals 0–47 representing ranges of the position of the data head correspond to the representations $a_{04}$–$l_{04}$ in the table 4, respectively.

Figure 9:
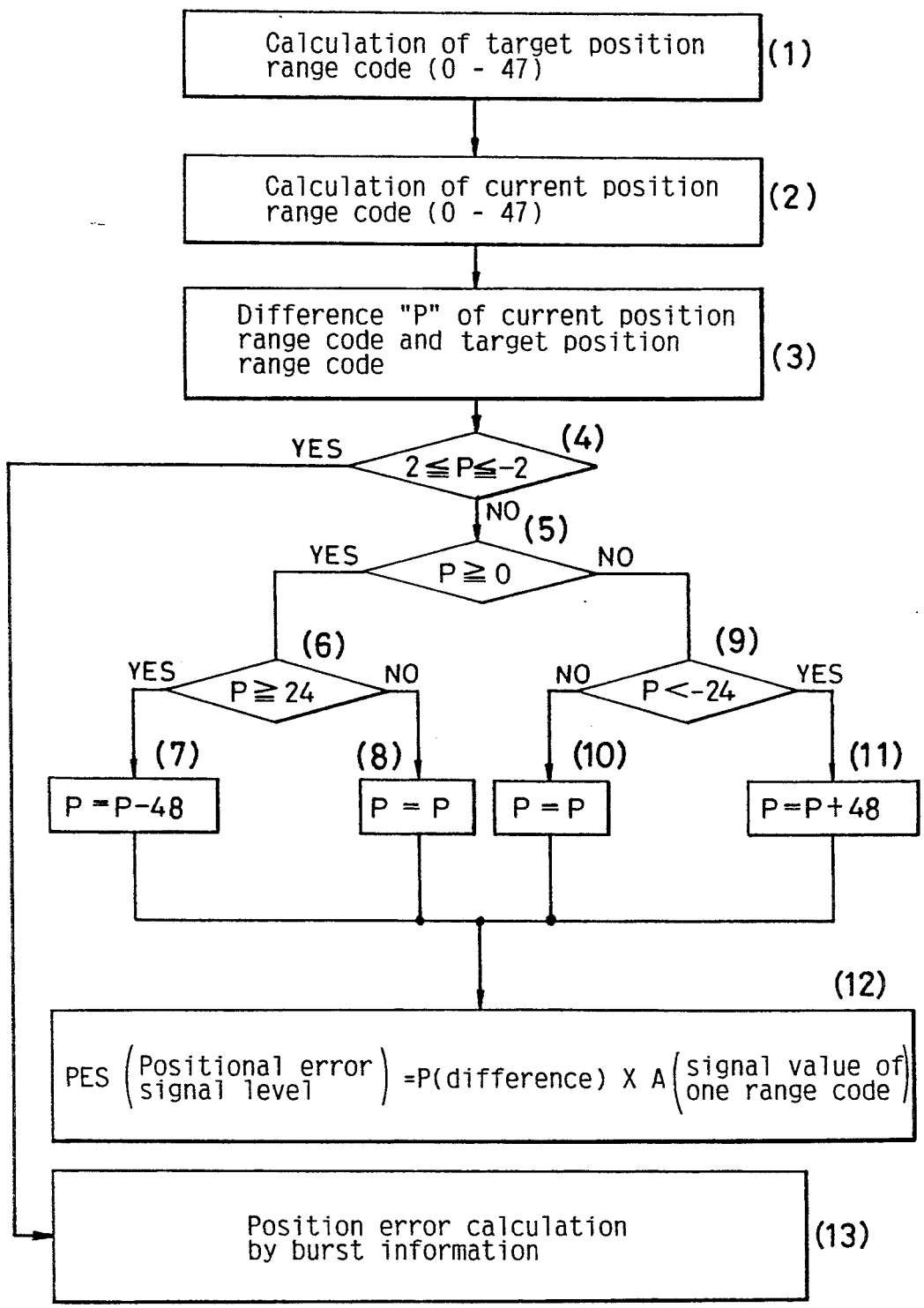
FIG. 9 is a flow-chart of a method for generating the expanded position signal as shown in FIG. 8 by using the data head positional information recognition means which recognizes the relative positional relation of the data head and the track with a resolution of $1/(2^2)$ of the information track width and the CPU.

FIG. 9 is a flow chart of a method for generating the expanded position signal shown in FIG. 8 by using the data head positional information recognition apparatus 10 and the in-track position decoder 9 which recognizes a relative position between the data head and a target track with the resolution of 1/(2) of the information track width.

For example, when 81st track of a recording medium is a target track, the numeral 81 is divided by 12. Then, the quotient is 6, and the remainder is 9 (81÷12=6 ... 9). Hence, the target track position is represented by a range code 36 in the resolution of 1/(2) of the information track width (9×4=36) (Step 1 in FIG. 9). Provided that the data head 5 is present at 10-th track of the recording medium at present, the range code at the 10-th track is 40 (10÷12=0 ... 10, therefore 10×4=40) (Step 2), and the distance from the data head 5 to the target track is represented by a range code difference (P) 284 ((81−10)×4=284) (Step 3). After start of the seek action from the 10-th track to the 81st track, the data head 5 detects a position represented by the range code in the resolution of 1/(2) of the information track width. Then a travel distance and a velocity is calculated on the basis of a position detected at last passing of a servo sector and a current position detected by passing of next servo sector.

For example, when the data head has passed a first servo sector after start of the seek action and has detected the range code 46, the travel distance of the data head 5 is represented by the range code 6 (46−40=6). Therefore, the remainder is represented by a range code difference 278 (284−6=278). Then, if the range code 6 is detected when the data head has passed the subsequent servo sector, the travel distance from the prior servo sector is represented by a range code difference 8 (48−46+=8), and the remaining distance to the target track is represented by a range code difference 270 (278−8=270). In calculation of the travel distance, in the event that the range code value of the current position of the data head is small and the previous range code value where the data head has previously positioned is large, the travel distance is obtained by the calculation of "48−(previous range code)+(current range code)".

By repeating the above-mentioned seek action, the remaining distance to the target track is gradually decreased. Then, when the remaining distance falls below the range code difference 24 (6 tracks×4=24), an expanded position signal is generated from the data head positional signal generating apparatus 100. As shown in FIG. 8, when the remaining distance is less than the range code difference 24 with respect to the target track of 81st (range code 36), and when the range code of a detected servo sector is 16, a positional error signal level (hereinafter is referred to as "PES") based on the expanded position signal is represented by −20A (16−36=−20) (A: a signal level of 1/24 of the level of the expanded position signal). The expanded position signal having the PES of "−20A" is applied to the VCM position 6 through the compensator 15, the switch 16 and the current driver 17. The moving velocity of the data head depends on the PES of the expanded position signal. The center of the target track (range code 36) is made to place at the center of the expanded position signal (zero level position) as shown in FIG. 8. Consequently, a control signal in the control system using the expanded position signal has a positive value after the center of the target track and has a negative value before the center of the target track. Therefore, when the data head approaches a target track from the outer part or the inner part of the recording medium, the expanded position signal approaches zero from a positive value +24 or a negative value −24.

Subsequently, provided that the range code obtained from the last passed servo sector is 24, the PES between the data head and the target track is −12A in the expanded positional signal ((24−36)A=−12A)). After the range code difference P has entered within the range of ±2 (−2≦P≦2) (Step 4), the positional error between the data head and the center of the target track is detected by using the burst information (Step 13). Thereafter, control mode of the data head 5 is changed to the tracing control mode (position control mode) from the seek mode (velocity control mode).

When the data head 5 approaches the target track from a peripheral part of the recording medium, the expanded position signal having a positive value is generated (for example +24 and below) (Step 8 and 10). In the event that the data head passes a servo sector and detects a range code 8 of a servo sector, the PES becomes +20A as shown by steps 12 in the flow chart of FIG. 9. After the positional error to the target track has entered within the range of ±2 range code difference the positional error between the data head and the center of the target track is detected by using the burst information.

Function and operation of the expanded position signal is elucidated here after.

First, the seek operation is elucidated. When a target track is instructed in the data head positioning apparatus shown in FIG. 1, a velocity instruction signal for instructing a moving velocity of the data head is output from the velocity instruction part 11. The velocity instruction signal has a value corresponding to a distance between the target track and the current position of the data head 5. After start of the data head 5, the moving velocity of the data head 5 is detected by the velocity detector 12, and a difference between the instructed velocity and the detected velocity is detected by the error amplifier 13. The output of the error amplifier 13 is applied to the VCM positioner 6, and the data head 5 is moved to the target track with the instructed velocity.

A range code is detected at every passing of the servo sectors by the data head 5, and the position of the data head 5 is detected with the resolution of $1/(2^2)$ of the information track width by the data head position information recognition apparatus 10 of the data head positioning signal generating apparatus 100. Then, the travel distance of the data head 5 is calculated on the basis of the range code of the current position and the range code of the last position of the data head 5. In the data head positioning signal generating apparatus 100, the travel distance represented by the range code difference is calculated by subtracting the current position of the data head 5 from a travel distance calculated in advance ((target track number−the track number of the current position)×4), and the rest of the distance is obtained.

When the rest of the distance represented by a range code difference has dropped below 24, the expanded position signal of the periodic interval of 12 tracks is generated by the data head positioning signal generating apparatus 100. In order to make to rush the data head to the target track as fast as possible and to reduce a settling time in the tracing control mode, changeover from the velocity control mode to the tracing control mode is preferably before 2 or 3 tracks of the target track. When the data head arrives at the position before 6 track of the target track, it is recommendable that the data head is moved in the velocity control mode until before 2 or 3 tracks of the target track, and at that position, the velocity control mode is changed to the tracing control mode by switching the switch 16 to a contact 16B. Thereafter, the data head 5 is settled to the center of the target track on the basis of the PES calculated in compliance with the expanded position signal which has the range code zero at the center of the target track.

Figure 10A:
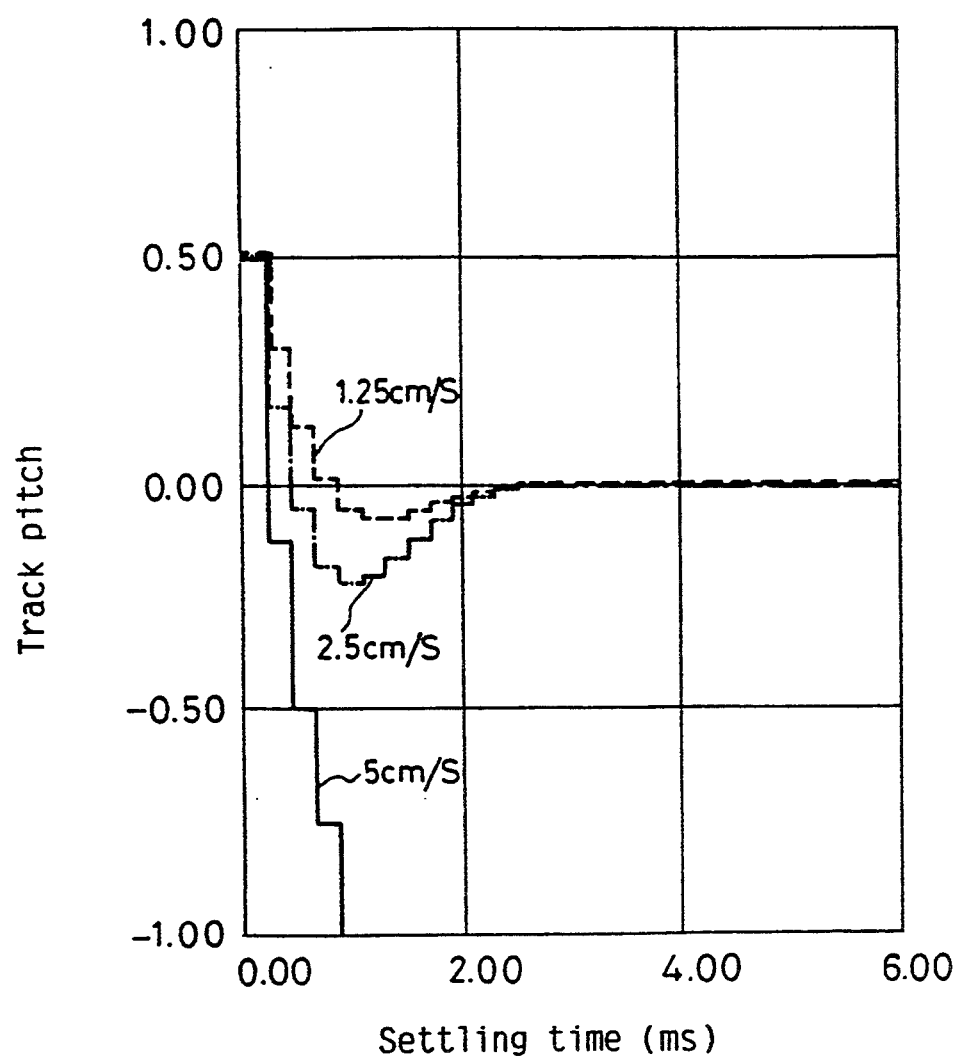
FIGS. 10(a) and 10(b) are charts of settling times and a track pitch in the case of the dynamic range of $\pm\frac{1}{2}$ tracks and the dynamic range of $\pm 6$ tracks, respectively.
Figure 10B:
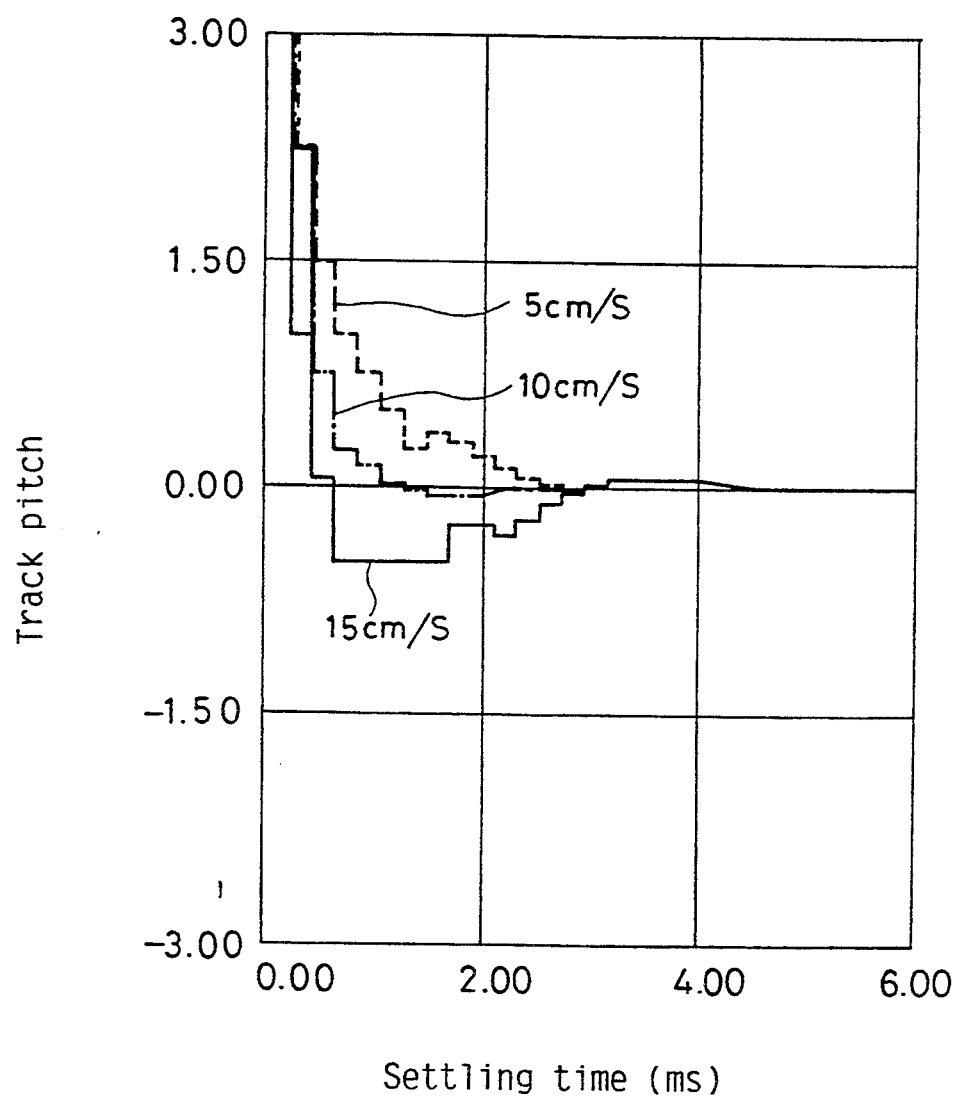

FIG.10(a) is the diagram of a settling time of the data head positioning apparatus in the prior art, and FIG.10(b) is the diagram of a settling time of the data head positioning in the present invention. Ordinates designate a track pitch, and abscissas designate settling times. In FIGS. 10(a) and 10(b), rush velocities of the data head (1.25 cm/s, 2.5 cm/s, 5 cm/s, 10 cm/s and 15 cm/s) are parameters. The track pitch graduated at the starting point of each curve represents the rush position of the data head. These diagrams show the expanded position signal in the resolution of $1/(2^2)$ of the information track width based on a sampling time of 208 μsec.

In FIG. 10(a), the dynamic range of the position signal is about $\pm\frac{1}{2}$ tracks, and the control mode is changed from the velocity control mode to the tracing control mode before $\frac{1}{2}$ tracks of the target track. In cases of 1.25 cm/s and 2.5 cm/s of rush velocity, the data head is settled to the target track within 3 ms, though there is an overshoot on the travel thereof. In case of 5 cm/s of rush velocity, the data head is not settled to the target track in the given dynamic range of the position signal because of an excessive rush velocity. Thus the data head falls in seek error.

In FIG. 10(b), the dynamic range of the position signal is about ±6 tracks, and the control mode is changed from the velocity control mode to the tracing control mode before 3 tracks of the target track. In case of 5 cm/s rush velocity, the data head is settled to the target track with a slight undershoot on the travel thereof. In case of 15 cm/s, the data head is settled to the target track with a slight overshoot on the travel thereof. In case of 5 cm/s, the data head is satisfactorily settled to the target track. As shown in FIG. 10(b), the data head can be rushed to the target track with such a high velocity by using the expanded position signal, and a high velocity access of the data head is realizable. In other words, even if the rush velocity deviates from a predetermined value, the data head is safely settled to the target track, and reliability in seek operation of the data head is improved.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is Intended that the appended claims be interpreted as covering all alterations and modifications as fall within the true spirit and scope of the invention.

What is claimed is:

1. Method for generating data head positioning signal comprising the steps of:
    discretely forming servo-patterns in circular direction of a track of a rotatable recording medium, said servo-pattern comprising a first region and a second region having at least two burst patterns being finely detectable a positional deviation of said data head from the center of an information track, and said first region comprising at least two sub-servo-patterns having periodic interval of width of M tracks (M is an integer of 2 or more),
    peak values of reproduced signal amplitudes of the above-mentioned respective sub-servo-patterns are compared respectively thereby to form a first binary-valued information,
    subsequently adding a first offset onto, at least, one of those peak values of the aforementioned reproduced signal amplitude in compliance with a value of said first binary-valued information, then comparing respective peak values to each other again thereby to form a second binary-valued information,
    further adding a second offset onto a peak value on which said first offset was added in compliance with a value of the second binary-valued information,
    or further adding a different offset from the first offset onto a peak value on which no offset was added at the time when second binary-valued information was produced, then comparing respective peak values to each other again, thereby to form a third binary-valued information,
    then repeating the above-mentioned steps at least N times (N is an integer), thereby to recognize the data head position in the radial direction of a recording medium up to a precision of $1/(2^N)$ of the information track width,
    generating a data head positioning signal weighted corresponding to a distance from a data head to a target track by using a signal of said first area in case that the absolute value of a positional error from said data head to said target track is larger than the half of a track width in positioning control of said data head and said target track, and
    generating an expanded position signal having a periodic interval of the width of M tracks and a dynamic range of the width of M tracks by using the signal of said second region in case that the absolute value of said positional error is the half of said track width or below.

2. Apparatus for generating a data head positioning signal comprising:
    data head positioning information recognition means comprising,
        at least two peak holder for holding peak values of reproduced signal amplitudes of at least two sub-servo-patterns having a periodic interval of the width of M tracks being comprised in a first region of a servo pattern formed discretely in the circular direction of a track of a rotatable recording medium,
        at least one comparator for comparing said at least two peak values,
        a first latch for memorizing the output of said comparator, thereby to hold a first binary-valued information,
        an offset decoder for determining to which peak holder an offset is to be added in compliance with the contents of said first latch,
        an offset-adder for adding an offset to a specified peak holder in compliance with the instruction of the offset decoder,
        a second latch for holding a second binary-valued information by memorizing momentarily a result obtained by a comparison between a peak value held by the peak holder to which the offset was already added and a peak value held by the peak holder to which offset was not added using said comparator again, N latches for latching N binary-valued informations from 1st to N-th binary-valued information, and a data head position information discrimination element for detecting the relative position relation of a data head with respect to tracks with a precision up to $1/(2^N)$ of the information track width by using contents from the 1st latch to the N-th latch, in-track position decoder for recognizing an in-track position information of said data head from at least two burst patterns formed in a second region of said servo pattern, and a central processing means ($\mu$CPU) for generating a data head positioning signal having a dynamic range of the width of M tracks in periodic interval of the width of said M tracks, by using outputs of said data head position information recognition means and said in-track position decoder.

3. Head positioning apparatus comprising:

a data head for reproducing information of servo-patterns formed discretely in circular direction of a rotatable recording medium, a servo information demodulator for taking out the servo information included in said discrete servo-patterns out of reproduced signal from said data head, an in-track position detector for recognizing a deviation of distance between said data head and the center of a target track from the output of said information demodulator, data head positioning signal generating apparatus comprising:

data head positioning information recognition means comprising, at least two peak holder for holding peak values of reproduced signal amplitudes of at least two sub-servo-patterns having a periodic interval of the width of M tracks being comprised in a first region of a servo pattern formed discretely in the circular direction of a track of a rotatable recording medium, at least one comparator for comparing said at least two peak values, a first latch for memorizing the output of said comparator, thereby to hold a first binary-valued information, an offset decoder for determining to which peak holder an offset is to be added in compliance with the contents of said first latch, an offset-adder for adding an offset to a specified peak holder in compliance with the instruction of the offset decoder, a second latch for holding a second binary-valued information by memorizing momentarily a result obtained by a comparison between a peak value held by the peak holder to which the offset was already added and a peak value held by the peak holder to which offset was not added using said comparator again, N latches for latching N binary-valued informations from 1st to N-th binary-valued information, and a data head position information discrimination element for detecting the relative position relation of a data head with respect to tracks with a precision up to $1/(2^N)$ of the information track width by using contents from the 1st latch to the N-th latch, in-track position decoder for recognizing an in-track position information of said data head from at least two burst patterns formed in a second region of said servo pattern, a central processing means ($\mu$CPU) for generating a data head positioning signal having a dynamic range of the width of M tracks in periodic interval of the width of said M tracks, by using outputs of said data head position information recognition means and said in-track position decoder, velocity instruction means for outputting a track access velocity instruction in compliance with the distance to said target track based on the output of said position information recognition means, velocity recognition means for computing a moving velocity of said data head in the radial direction of the recording medium based on the output of said data head position information recognition means, and positioning means for moving the data head to an arbitrary position in the radial direction of said recording medium, by feeding back a signal, based on the output of said data head positioning signal generating apparatus in track tracing control and a signal based on velocity error between the output of said velocity instruction means and the output of said velocity recognition means in track access control to said positioning means.

* * * * *